(12) United States Patent
Magri et al.

(10) Patent No.: US 10,897,179 B2
(45) Date of Patent: Jan. 19, 2021

(54) ROTOR FOR A ROTARY ELECTRIC MACHINE

(71) Applicant: MARELLI EUROPE S.p.A., Corbetta (IT)

(72) Inventors: Marco Magri, Bologna (IT); Francesco Leli, Grottammare (IT); Salvatore Stamato, Corleto Monforte (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 16/299,599

(22) Filed: Mar. 12, 2019

(65) Prior Publication Data

US 2019/0288579 A1 Sep. 19, 2019

(30) Foreign Application Priority Data

Mar. 13, 2018 (IT) .......................... 102018000003491

(51) Int. Cl.
*H02K 1/27* (2006.01)
*H02K 1/28* (2006.01)
(Continued)

(52) U.S. Cl.
CPC .............. *H02K 7/04* (2013.01); *H02K 1/276* (2013.01); *H02K 1/2766* (2013.01); *H02K 1/28* (2013.01); *H02K 1/02* (2013.01)

(58) Field of Classification Search
CPC ......... H02K 1/276; H02K 1/2766; H02K 7/04
(Continued)

(56) References Cited

U.S. PATENT DOCUMENTS

| 2010/0231064 A1* | 9/2010 | Leachman | ............... H02K 7/04 |
| | | | 310/51 |
| 2014/0375166 A1 | 12/2014 | Barton et al. | |
| 2015/0340917 A1* | 11/2015 | Ikura | ....................... F16D 1/06 |
| | | | 403/29 |

FOREIGN PATENT DOCUMENTS

| CN | 106208584 A | 12/2016 |
| JP | 2005304177 A | * 10/2005 |

(Continued)

OTHER PUBLICATIONS

Hoshika, Machine Translation of JP2007259583, Oct. 2007 (Year: 2007).*

(Continued)

*Primary Examiner* — Quyen P Leung
*Assistant Examiner* — Eric Johnson
(74) *Attorney, Agent, or Firm* — Howard & Howard Attorneys PLLC

(57) ABSTRACT

A rotor for a rotary electric machine; the rotor has: a shaft, which is mounted so as to rotate around a rotation axis; a magnetic core, which is arranged around the shaft and consists of a plurality of lamination sheets stacked together; and a pair of end discs, which are arranged around the shaft at the two opposite ends of the magnetic core and are designed to keep the lamination sheets of the magnetic core stacked together; wherein the end discs are designed to have balancing holes, which dynamically balance the rotor around the rotation axis. Each end disc consists of an inner component with an annular shape, which is arranged around the shaft and is made of a first metal material, and of an outer component with an annular shape, which is arranged around the inner component and is made of a second metal material, which is different from the first metal material and is non-magnetic.

13 Claims, 10 Drawing Sheets

(51) Int. Cl.
*H02K 7/04* (2006.01)
*H02K 1/02* (2006.01)

(58) Field of Classification Search
USPC .................. 310/216.114, 216.116, 216.117
See application file for complete search history.

(56) References Cited

FOREIGN PATENT DOCUMENTS

| JP | 2007259583 A | * | 10/2007 | |
|---|---|---|---|---|
| JP | 2010004630 A | * | 1/2010 | |
| JP | 2015104224 A | * | 6/2015 | |
| WO | WO-2014129086 A1 | * | 8/2014 | ............... H02K 1/30 |
| WO | 2015165131 A1 | | 11/2015 | |
| WO | 2015188985 A1 | | 12/2015 | |
| WO | WO-2018097305 | * | 5/2018 | |

OTHER PUBLICATIONS

Suzuki, Machine Translation of JP2010004630, Jan. 2010 (Year: 2010).*
Totoki, Machine Translation of WO2014129086, Aug. 2014 (Year: 2014).*
Kamiya, Machine Translation of JP2005304177, Jun. 2015 (Year: 2015).*
Arigami, Machine Translation of WO2018097305, May 2018 (Year: 2018).*
Arigami, Machine Translation of JP2015104224, Jun. 2015 (Year: 0620).*
Search Report for Italian Patent Application No. 201800003491 dated Oct. 10, 2018.

* cited by examiner

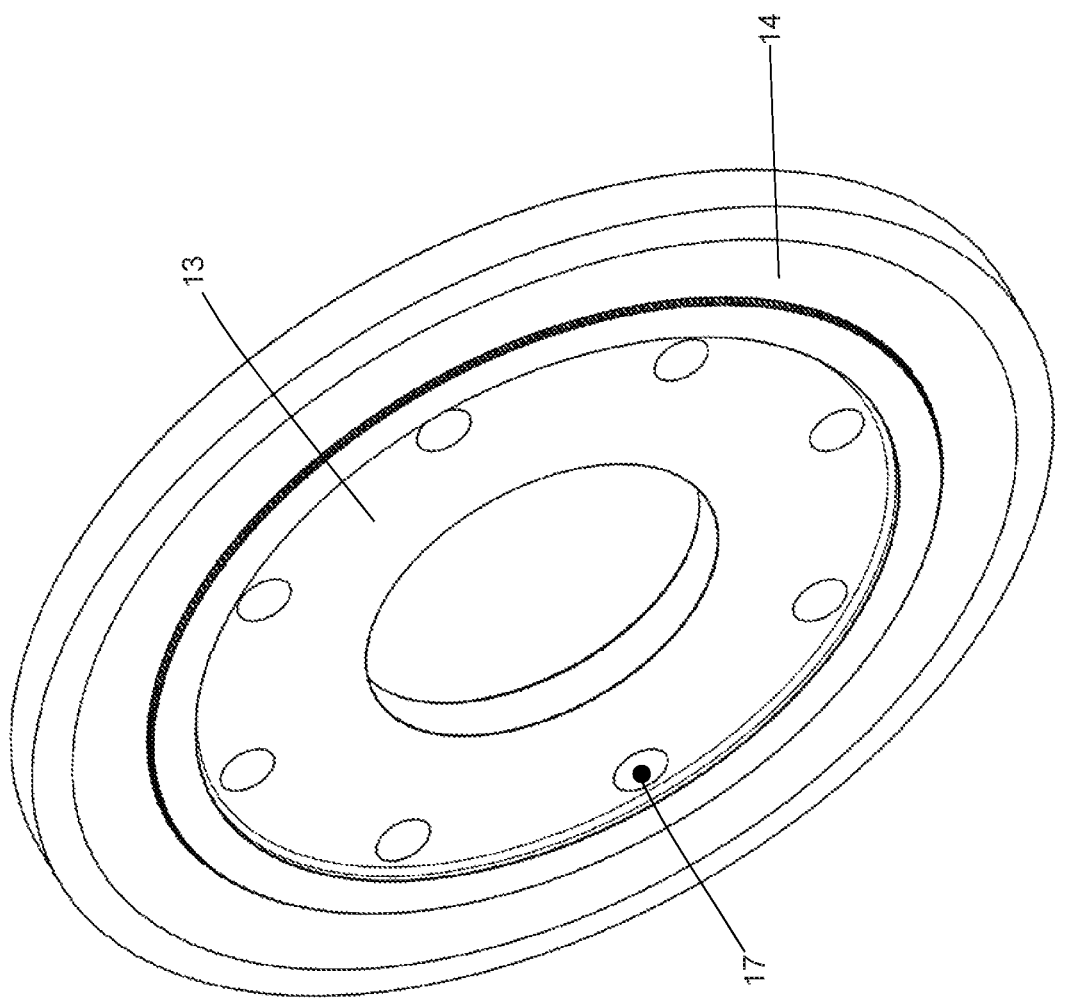
Fig. 3

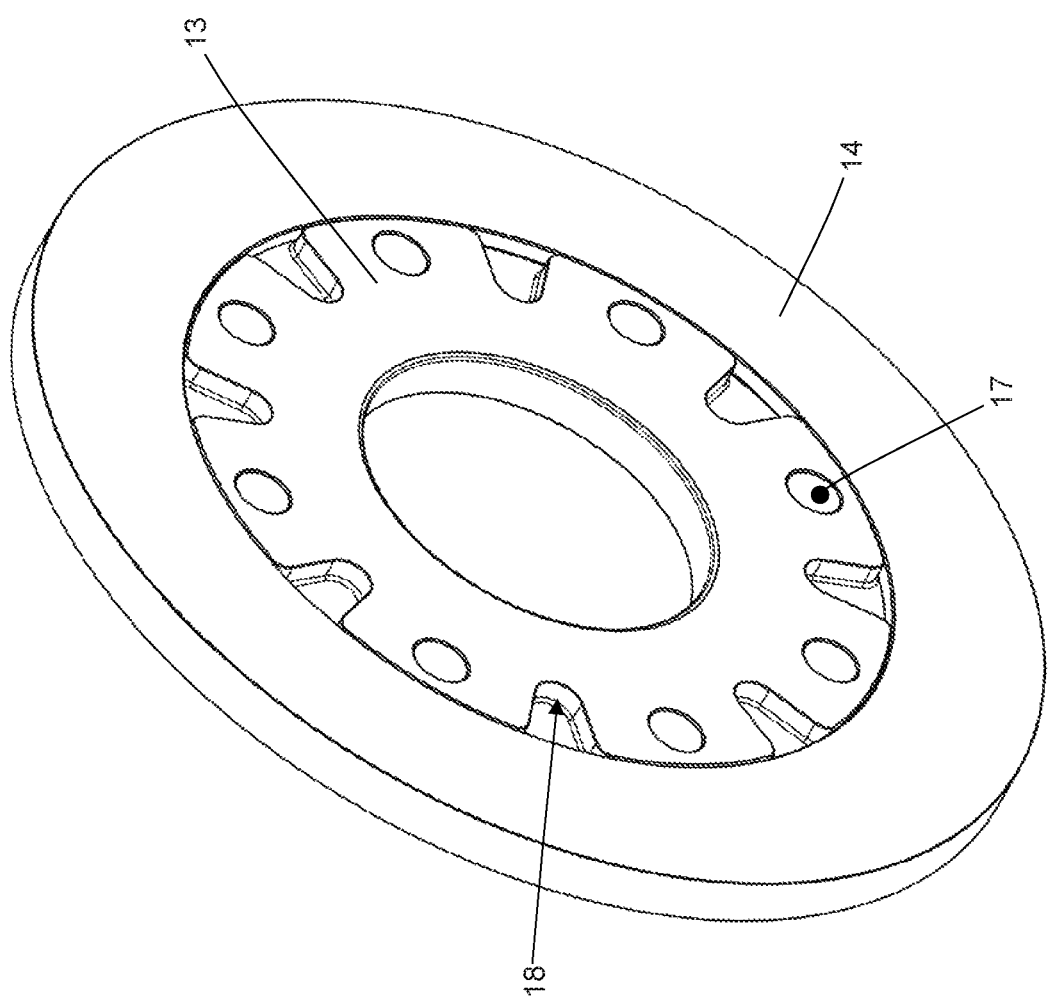

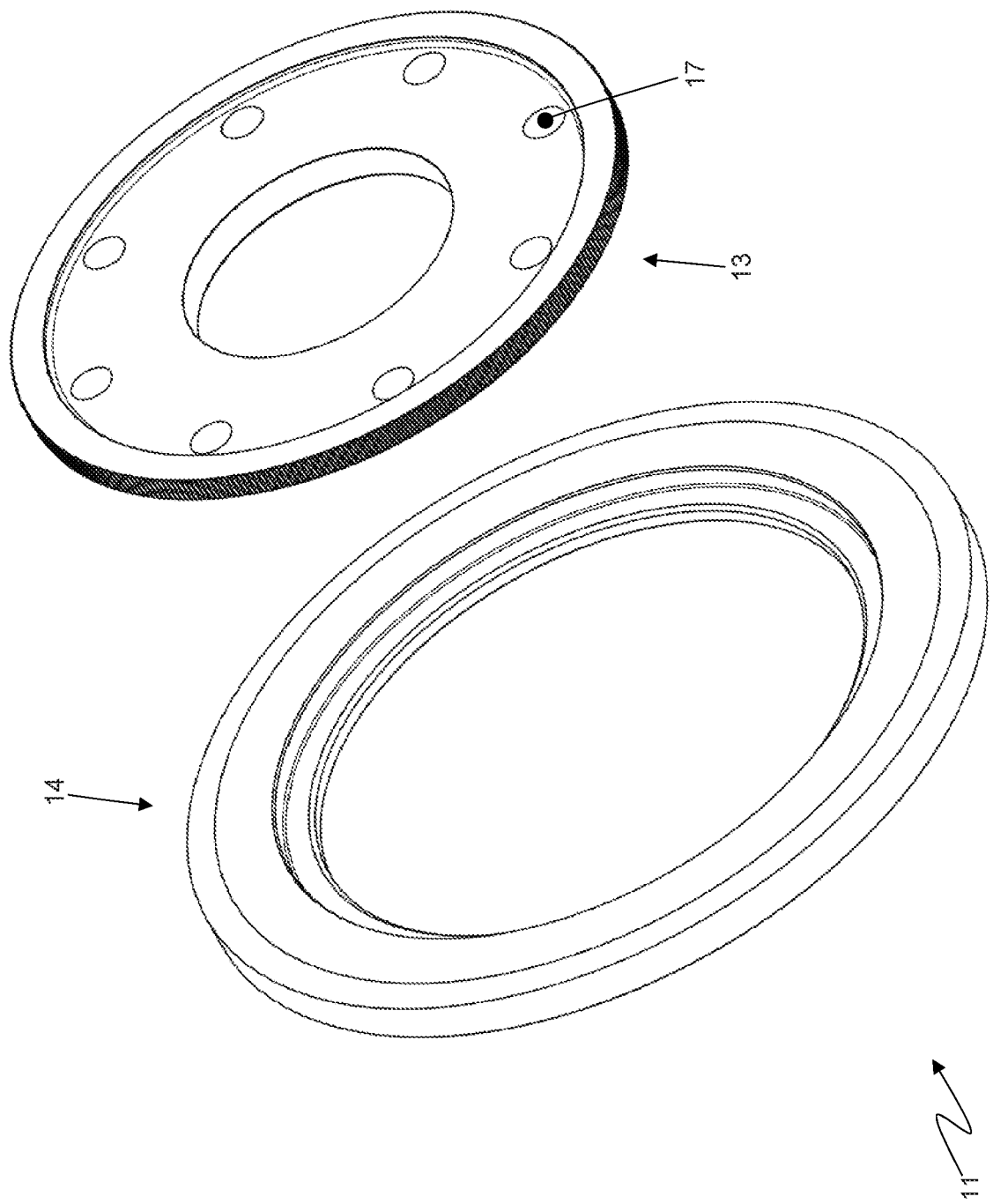

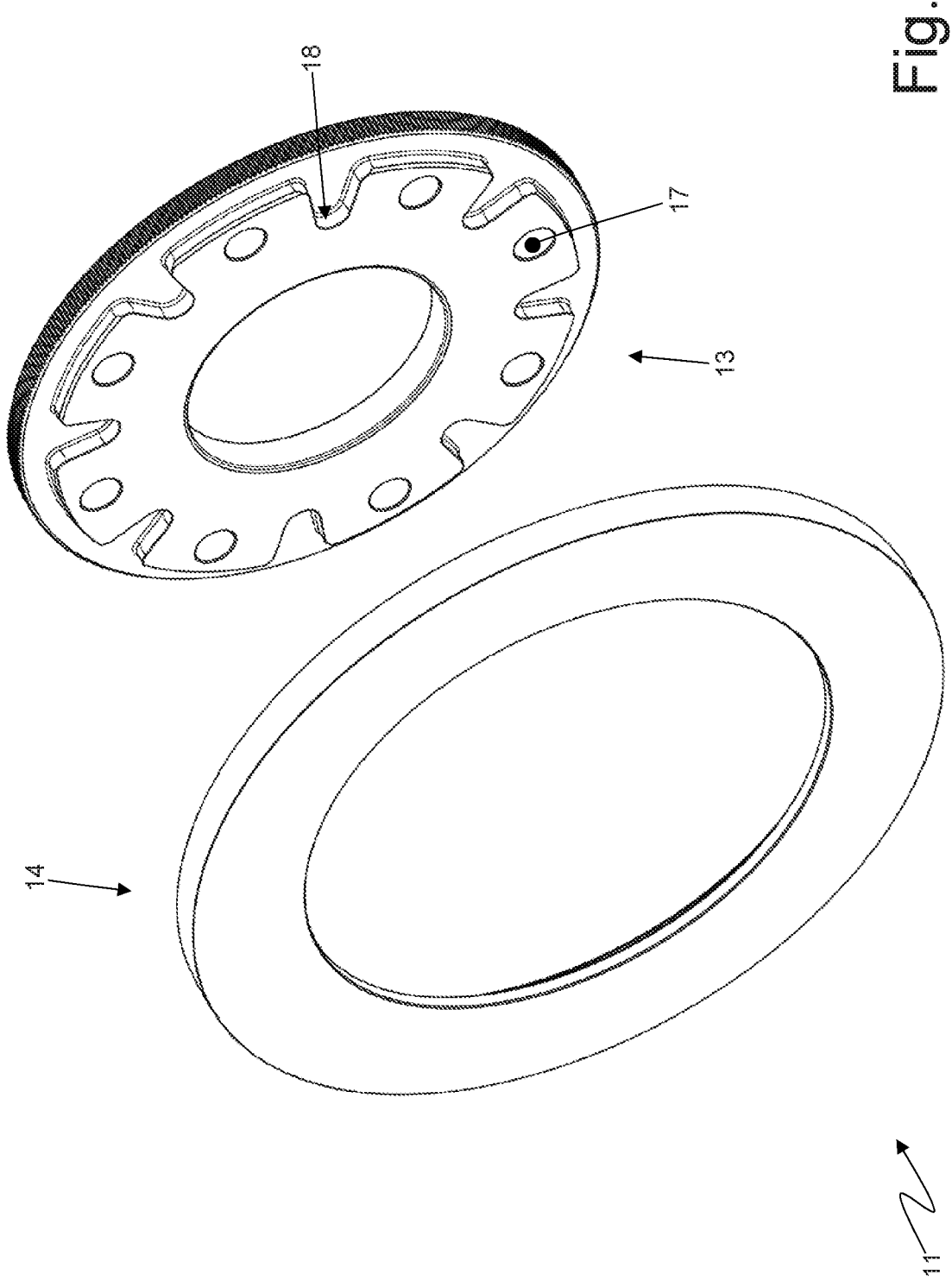

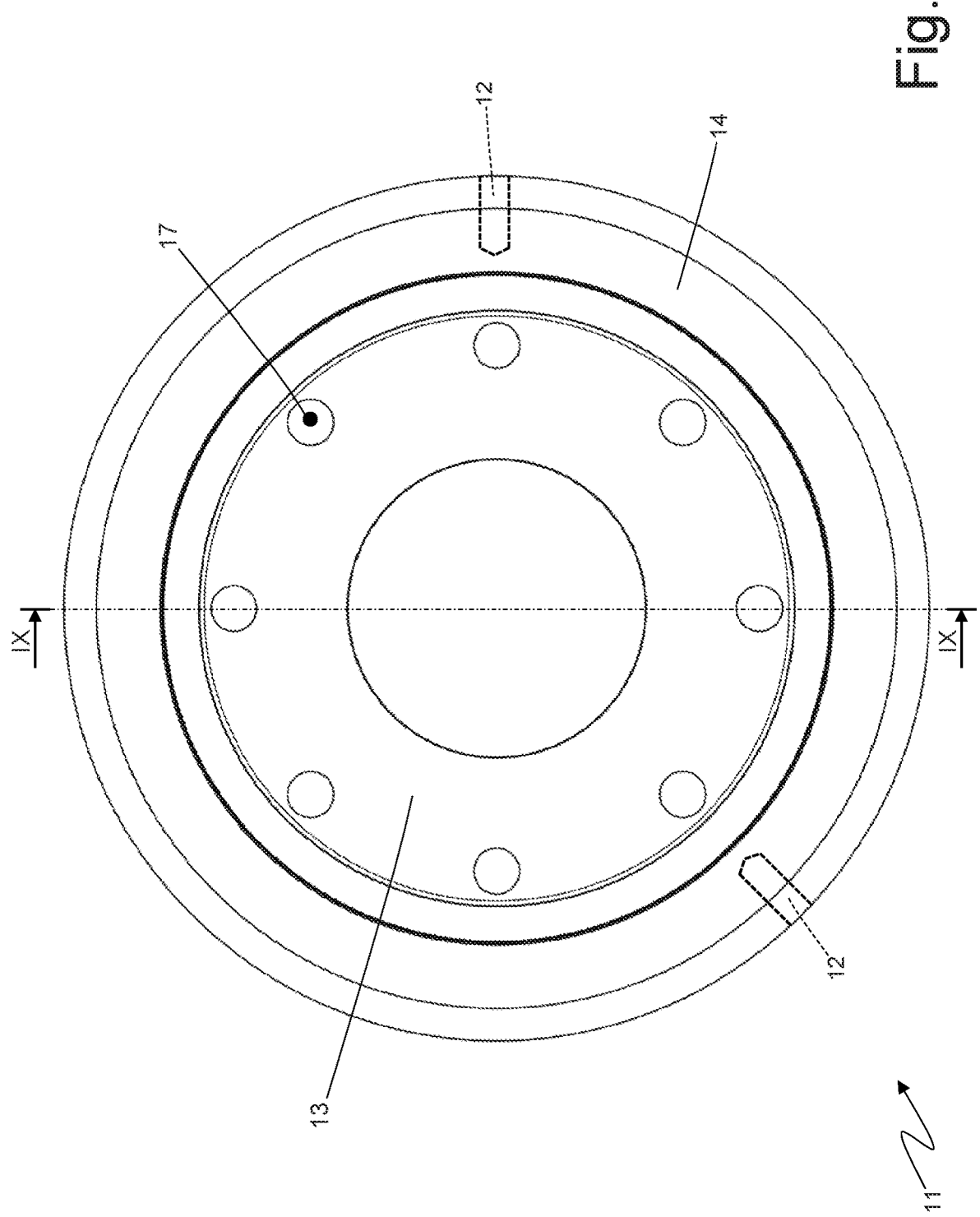

ROTOR FOR A ROTARY ELECTRIC MACHINE

CROSS-REFERENCE TO RELATED APPLICATIONS

This patent application claims priority from Italian patent application no. 102018000003491 filed on Mar. 13, 2018 the entire disclosure of which is incorporated herein by reference.

TECHNICAL FIELD

The invention relates to a rotor for a rotary electric machine.

The invention can advantageously be applied to a rotor with permanent magnets for a rotary electric machine for vehicle powering, to which explicit reference will be made in the description below without because of this loosing in generality.

PRIOR ART

A rotary electric machine comprises a shaft, which is mounted so as to rotate around a rotation axis, a rotor, which has an annular cylindrical shape and is rigidly fixed to the shaft, and a stator, which has an annular cylindrical shape and is arranged without contact (namely, with a magnetic gap of a few millimetres) around the rotor (namely, houses the rotor on the inside).

In order to allow the rotary electric machine to operate at high rotation speeds, ensuring, at the same time, a long operating life, the vibrations generated during the operation, which must be absorbed by the bearings supporting the shaft, need to be minimized. To this aim, the rotor often needs to be balanced so as to reduce dynamic unbalances (due to unavoidable constructive tolerances), which generate vibrations during the rotation.

In order to allow the rotor to be balanced, two end discs were suggested, which are arranged on the two opposite sides of the magnetic core of the rotor and fulfil both the function of keeping the lamination sheets making up the magnetic core stacked together (like a pack) and the function of acting as balancing elements thanks to adjusted asymmetries in their mass. For example, in balancing discs, adjusted asymmetries of their mass could be created through (radially and/or axially oriented) dead holes, which are made through the balancing discs themselves.

In known rotary electric machines, the end discs are generally made of a non-magnetic (namely, non-ferromagnetic) metal material, so as to prevent relevant parasitic currents from being induced in the end discs, thus generating, as a consequence, significant power losses; for example, the end discs are made of stainless steel, which is a non-magnetic (namely, non-ferromagnetic) metal material.

However, when the size of the rotor increases, manufacturing the end discs with a non-magnetic metal material (such as stainless steel) has proved to lead to drawbacks, as non-magnetic metal materials usually deliver reduced mechanical performances; as a consequence, end discs made of a non-magnetic metal material (such as stainless steel) are not capable of properly keeping the lamination sheets making up the magnetic core stacked together. In other words, when the size of the rotor increases, the end discs made of a non-magnetic metal material tend to plastically deform (namely, to yield) due to the mechanical stresses produced by the rotation, thus causing the lamination sheets making up the magnetic core to loose their compact arrangement.

Therefore, in larger rotors, end discs are used, which are made of a magnetic metal material, which offers better mechanical performances and, hence, is capable of resisting, without being subjected to plastic deformations, the mechanical stresses produced by the rotation. However, the end discs made of a magnetic metal material are affected by relevant power losses due to parasitic currents and, hence, determine a worsening of the energetic efficiency of the electric machine.

In large-sized electric machines, ends discs were suggested, which are made of a special metal material, which is non-magnetic, though has good mechanical features, or of a non-metal material, which has good mechanical features; however, this solution leads to a significant increase both in the manufacturing costs of the end discs and in the processing costs arising from the coupling of the end discs to the shaft.

Patent application CN106208584A1 describes a rotor for a rotary electric machine comprising: a shaft, which is mounted so as to rotate around a rotation axis; a magnetic core, which is arranged around the shaft and consists of a plurality of lamination sheets stacked together; and a pair of end discs, which are arranged around the shaft at the two opposite ends of the magnetic core, are designed to keep the lamination sheets of the magnetic core stacked together and are provided with respective pressing rings. The dynamic balancing of the rotor is carried out by means of balancing blocks (namely, balancing masses), which are arranged in annular grooves obtained in the pressing rings of the end discs.

Patent application US2014375166A1 describes a squirrel cage rotor for a rotary electric machine comprising: a shaft, which is mounted so as to rotate around a rotation axis; a magnetic core, which is arranged around the shaft and consists of a plurality of lamination sheets stacked together; and a pair of end discs, which are arranged around the shaft at the two opposite ends of the magnetic core and are designed to keep the lamination sheets of the magnetic core stacked together. No solution for the dynamic balancing of the rotor is specified.

Patent application WO2015188985A1 describes a squirrel cage rotor for a rotary electric machine comprising: a shaft, which is mounted so as to rotate around a rotation axis; a magnetic core, which is arranged around the shaft and consists of a plurality of lamination sheets stacked together; and a pair of end discs, which are arranged around the shaft at the two opposite ends of the magnetic core and are designed to keep the lamination sheets of the magnetic core stacked together. The dynamic balancing of the rotor is carried out by means of balancing blocks (namely, balancing masses), which are applied in suitable seats specially obtained in the end discs.

Patent application WO2015165131A1 describes a rotor for a rotary electric machine comprising: a shaft, which is mounted so as to rotate around a rotation axis; a magnetic core, which is arranged around the shaft and consists of a plurality of lamination sheets stacked together; and a pair of end discs, which are arranged around the shaft at the two opposite ends of the magnetic core and are designed to keep the lamination sheets of the magnetic core stacked together. The dynamic balancing of the rotor is carried out by means of balancing bodies (namely, balancing masses), which are applied in suitable fitting holes specially made in the end discs.

DESCRIPTION OF THE INVENTION

The object of the invention is to provide a rotor for a rotary electric machine, which is not affected by the aforementioned drawbacks and, at the same time, can be manufactured in a straightforward and low-cost manner.

According to the invention, there is provided a rotor for a rotary electric machine according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein:

FIGS. 3 and 4 are two different perspective views of an end disc of the electric machine of FIG. 1;

FIGS. 5 and 6 are two different perspective and exploded views of the end disc of FIGS. 3 and 4;

FIGS. 7 and 8 are a front view and a rear view, respectively, of the end disc of FIGS. 3 and 4.

PREFERRED EMBODIMENTS OF THE INVENTION

Figure 1:
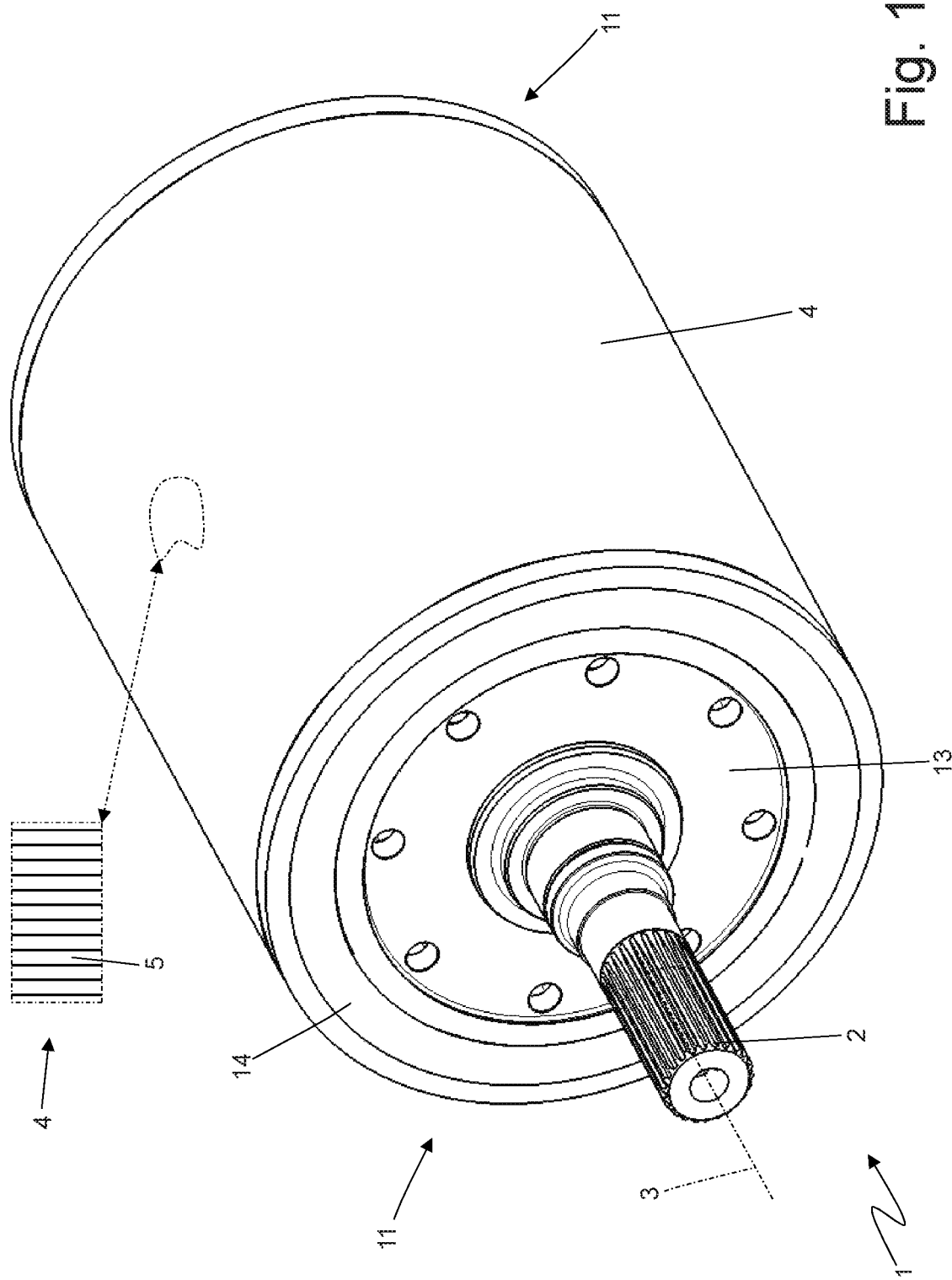
FIG. 1 is a perspective view of a rotor for a rotary electric machine manufactured according to the invention.

In FIG. 1, number 1 indicates, as a whole, a rotor of an electric machine for vehicle powering, said electric machine being a reversible electric machine (i.e. an electric machine which can work both as an electric motor, absorbing power and generating a mechanical torque, and as an electric generator, absorbing mechanical energy and generating power).

The rotor 1 comprises a shaft 2, which is mounted so as to rotate around a central rotation axis 3. The rotor 1 further comprises a magnetic core 4, which consists of a series of lamination sheets 5, which are radially oriented (namely, perpendicularly to the rotation axis 3) and are stacked together (like a pack).

Figure 2:
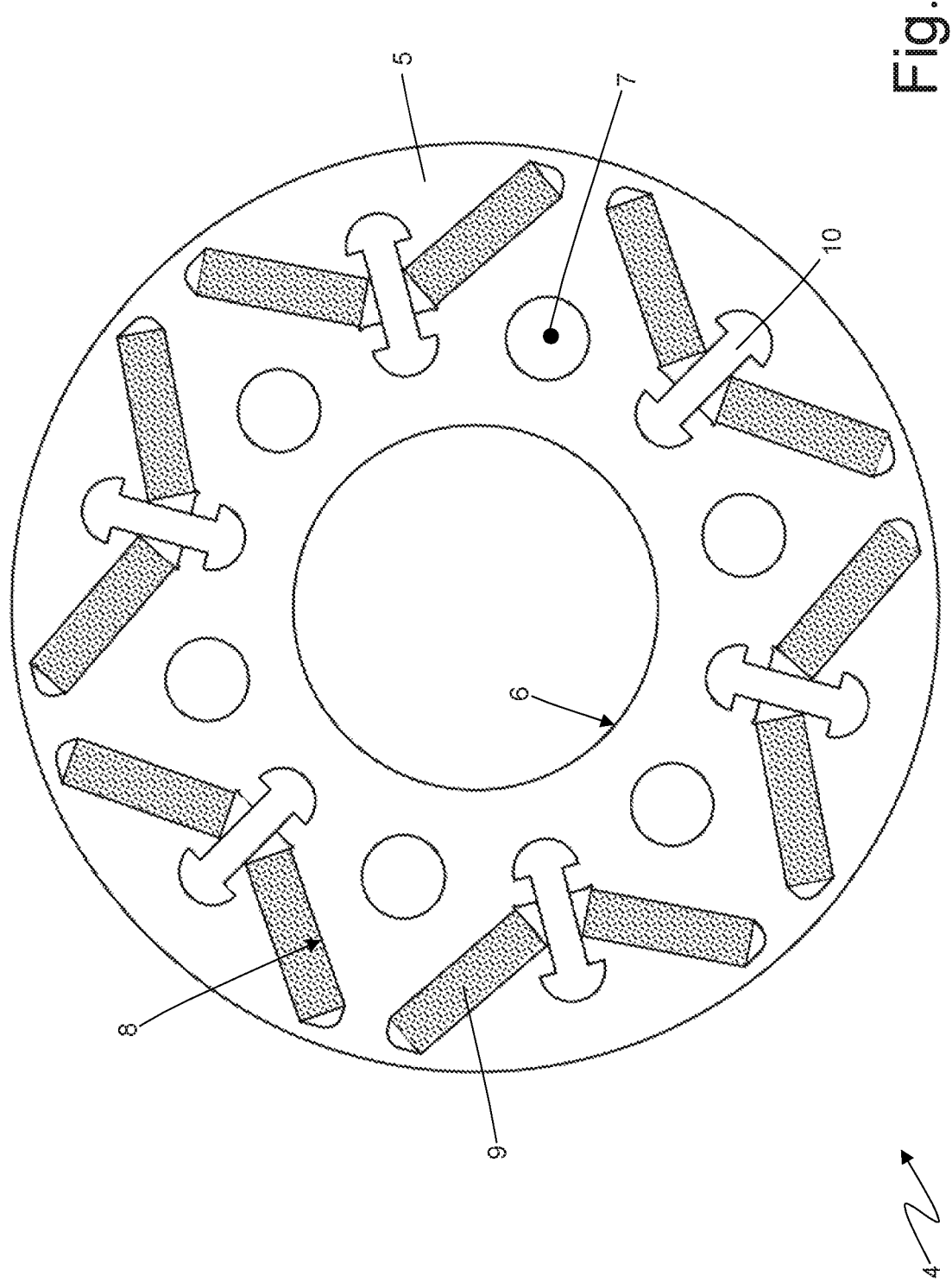
FIG. 2 is a cross section view of a magnetic core of the electric machine of FIG. 1.
Figure 8:
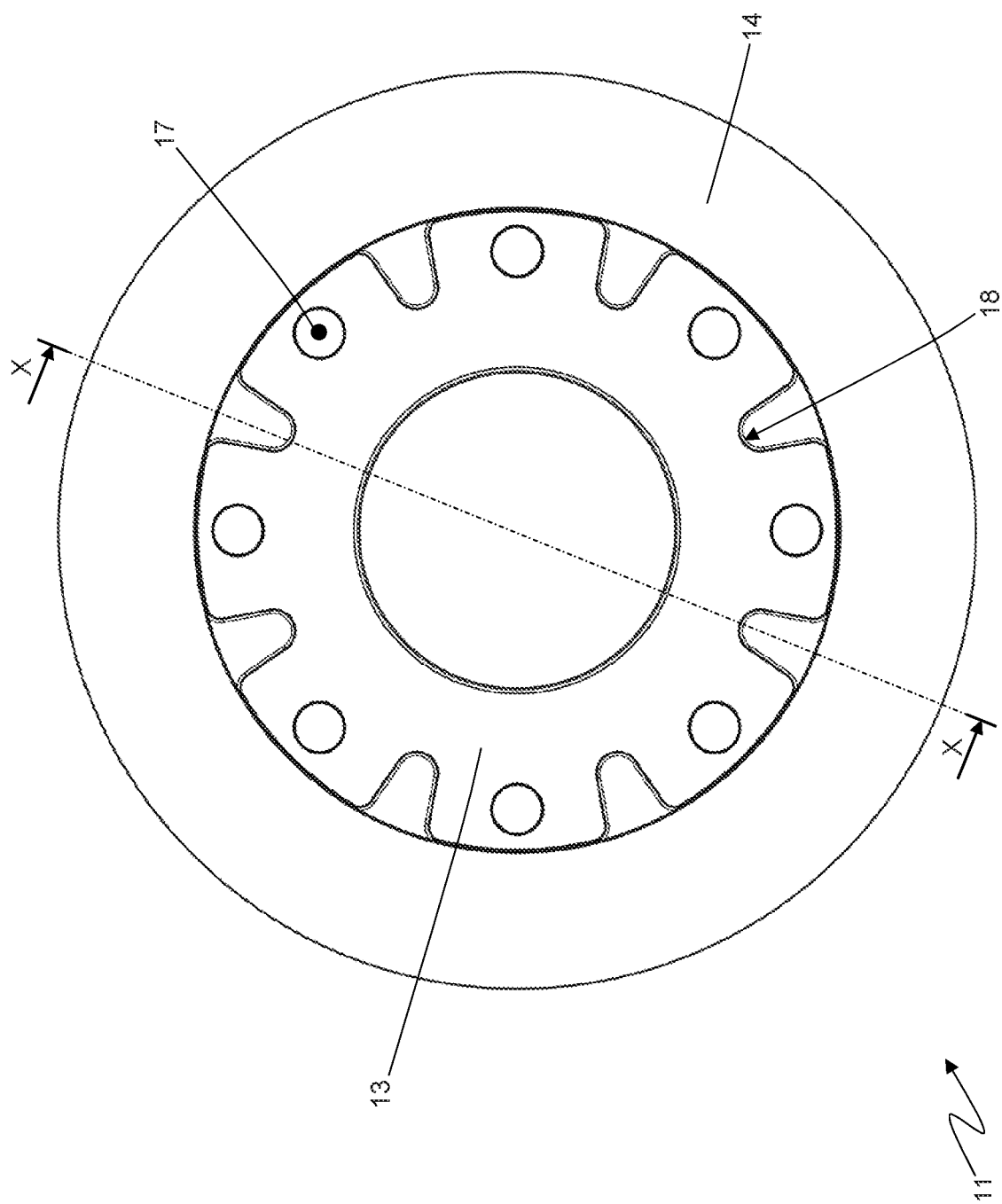

According to FIG. 2, the magnetic core 4 has a central hole 6, which is axially oriented (namely, parallel to the rotation axis 3) and in which the shaft 2 is arranged, a series of lightening holes 7, which are axially oriented (according to other embodiments which are not shown herein, there are no lightening holes 7), and a series of slots 8, which are axially oriented and have a rectangular shape. There is a series of permanent magnets 9 (with a rectangular cross section), which are arranged (housed) in the slots 8 of the magnetic core 4 (namely, in the slots 8 obtained through the magnetic core 4). According to a possible embodiment, between the pairs of permanent magnets 9 there are interposed inserts 10, which are made of a non-ferromagnetic metal and define magnetic gaps, which direct the magnetic flux; alternatively, the inserts 10 are replaced by through holes (namely, "air") or they are completely absent.

According to FIG. 1, the rotor 1 comprises a pair of end discs 11, which are arranged around the shaft 2 at the two opposite ends of the magnetic core 4 and are designed to keep the lamination sheets 5 of the magnetic core 4 stacked together. In other words, the two end discs 11 make up the two opposite ends of the rotor 1 and keep the lamination sheets 5 of the magnetic core 4 axially compressed, so as to keep the lamination sheets 5 stacked together.

The end discs 11 are designed to have balancing holes (shown in FIG. 7), which are arranged asymmetrically relative to the rotation axis 3 and dynamically balance the rotor 1 around the rotation axis 3. In order to allow the rotor 1 to operate at high rotation speeds, ensuring, at the same time, a long operating life, the vibrations generated during the operation, which must be absorbed by the bearings supporting the shaft 2, need to be minimized. To this aim, the rotor 1 often needs to be balanced so as to reduce dynamic unbalances (due to unavoidable constructive tolerances), which generate vibrations during the rotation.

In order to allow the rotor 1 to be balanced, the two end discs 11 are used, which act as balancing elements thanks to adjusted asymmetries of their mass generated by the balancing holes 12. In the embodiment shown in FIG. 7, the balancing holes 12 are dead holes and are radially arranged (namely, perpendicularly to the rotation axis 3); as an alternative or in addition, the balancing holes 12 could be axially arranged (namely, parallel to the rotation axis 3) and, in this case, be dead or through holes.

The presence, the number, the arrangement and the depth of the balancing holes 12 obviously are absolutely random and they can completely change from rotor 1 to rotor 1, as they depend on the actual dynamic unbalance (due to constructive tolerances) of the rotor 1 at the end of its manufacturing process. Theoretically speaking, a rotor 1 can be completely free from balancing holes 12, as, for a lucky combination of constructive tolerances, at the end its manufacturing process it is not affected by any dynamic unbalance around the rotation axis 3.

According to FIGS. 5 and 6, each end disc 11 consists of an inner component 13 with an annular shape, which is arranged around the shaft 2 and is made of a first metal material, and of an outer component 14 with an annular shape, which is arranged around the inner component and is made of a second metal material, which is different from the first metal material. In other words, each end disc 11 consists of two components 13 and 14 with an annular shape, which are arranged inside one another.

In each end disc 11, the inner component 13 with an annular shape is arranged around the shaft 2 in a radial position more on the inside than the permanent magnets 9 and is made of the first metal material; on the other hand, in each end disc 11, the outer component 14 with an annular shape is arranged around the inner component 13, faces the permanent magnets 8, is made of the second metal material, which is different from the first metal material and is non-magnetic, and is provided with the balancing holes 12.

In each end disc 11, the outer component 14 is completely arranged radially more on the outside than the inner component 13 and touches the inner component 13 only in the area of a contact surface with an annular shape, which is arranged parallel to the rotation axis 3; in other words, in each end disc 11, the two components 13 and 14 are completely arranged inside one another and are in no way (not even partially) arranged beside one another.

The first metal material making up the inner components 13 is ferromagnetic and has good mechanical performances (it typically has a high yield strength and a high ultimate tensile strength); in particular, the first metal material making up the inner components 13 has better mechanical performances (typically, a higher yield strength and a higher ultimate tensile strength) than the second metal material making up the outer components 14. The second metal material making up the outer components 14, unlike the first metal material making up the inner components 13, is non-magnetic (i.e. non-ferromagnetic); by way of example, the second metal material making up the outer components 14 could be stainless steel.

According to a preferred embodiment, in each end disc 11, the outer component (14) is coupled to the inner component 13 through interference. In other words, in each end disc 11, the outer component 14 is connected to the inner component 13 through a forced shape fitting (hence, the transmission of forces between the two components 13 and 14 takes place through the friction developing between the two contact surface); therefore, both the rotations around the rotation axis 3 and the relative radial and axial movements are constrained. In particular, this type of shape fitting consists of the coupling between the two components 13 and 14 with diameters that have a given interference and does not require intermediate material (such as bushings, locking elements, tabs . . . ).

The forced coupling between the components 13 and 14 of each end disc 11 can be obtained in two ways: through a longitudinal forced fitting, in which the two components 13 and 14 are coupled through the application of a force to the press, or through a transverse forced fitting, which implies a change in the diameter of the inner component 13 and/or of the outer component 14 because of a thermal effect (heating of the outer component 14 or cooling of the inner component 13); in the last case, the forced fitting is carried out when the temperature of the two components 13 and 14 goes back to ambient values.

According to other embodiments which are not shown herein, in each end disc 11, the mechanical coupling between the two components 13 and 14 is obtained by means of solutions other than an interference shape fitting, for example through welding or through bushings/pins/dowels. In each end disc 11, the two components 13 and 14 must basically be connected (fitted) to one another in any way deemed suitable to allow the two components 13 and 14 to become one single piece.

According to a preferred embodiment, in each end disc 11, the inner component 13 is coupled to the shaft 2 through interference. In other words, in each end disc 11, the inner component 13 is connected to the shaft 2 by means of a forced shape fitting, in the ways described above. According to other embodiments which are not shown herein, in each end disc 11, the mechanical coupling between the inner component 13 and the shaft 2 is obtained by means of solutions other than an interference shape fitting, for example through welding or through bushings/pins/dowels.

According to a preferred embodiment, at first, each inner component 13 is coupled to an outer component 14 so as to make up the corresponding end disc (11) and, subsequently, the end disc 11 is coupled to the shaft 2; in other words, at first, the two end discs 11 are assembled (by coupling the corresponding components 13 and 14) and, then, the complete end discs 11 are mounted on the shaft 2 so as to stack the lamination sheets 5 of the magnetic core 4 together.

Figure 9:
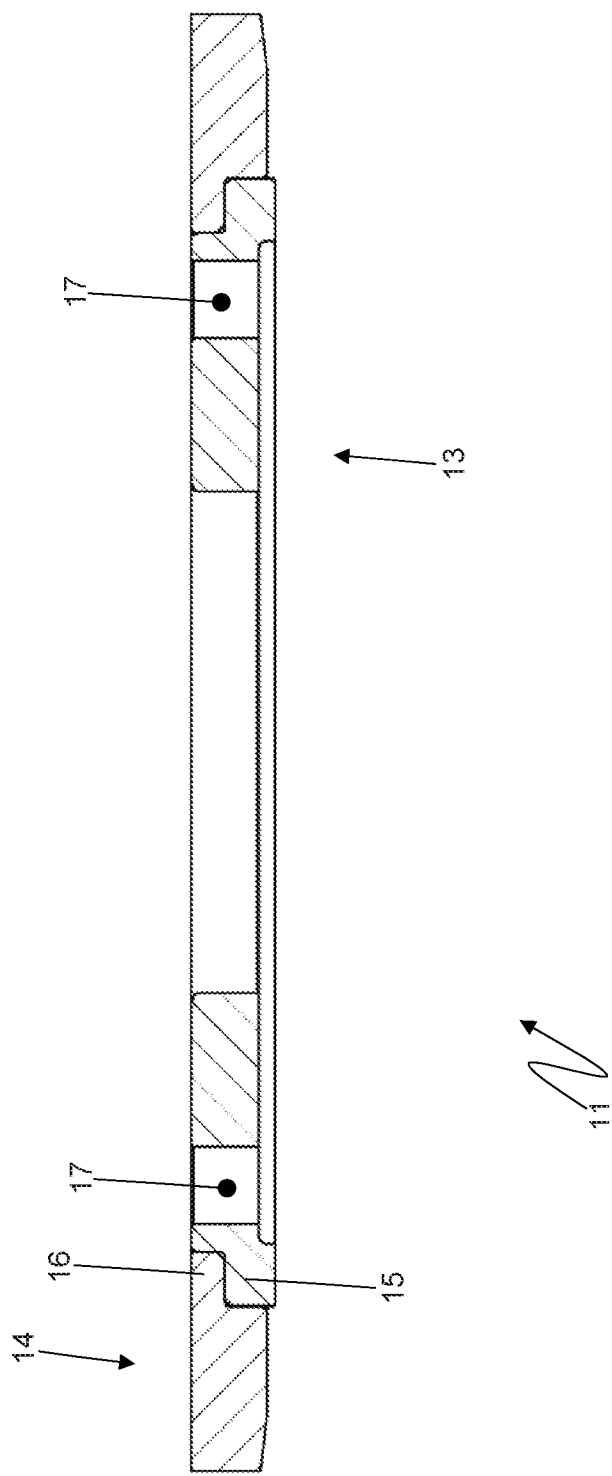
FIGS. 9 and 10 are two different cross section views along line IX-IX and along line X-X, respectively, of the end disc of FIGS. 3 and 4.
Figure 10:
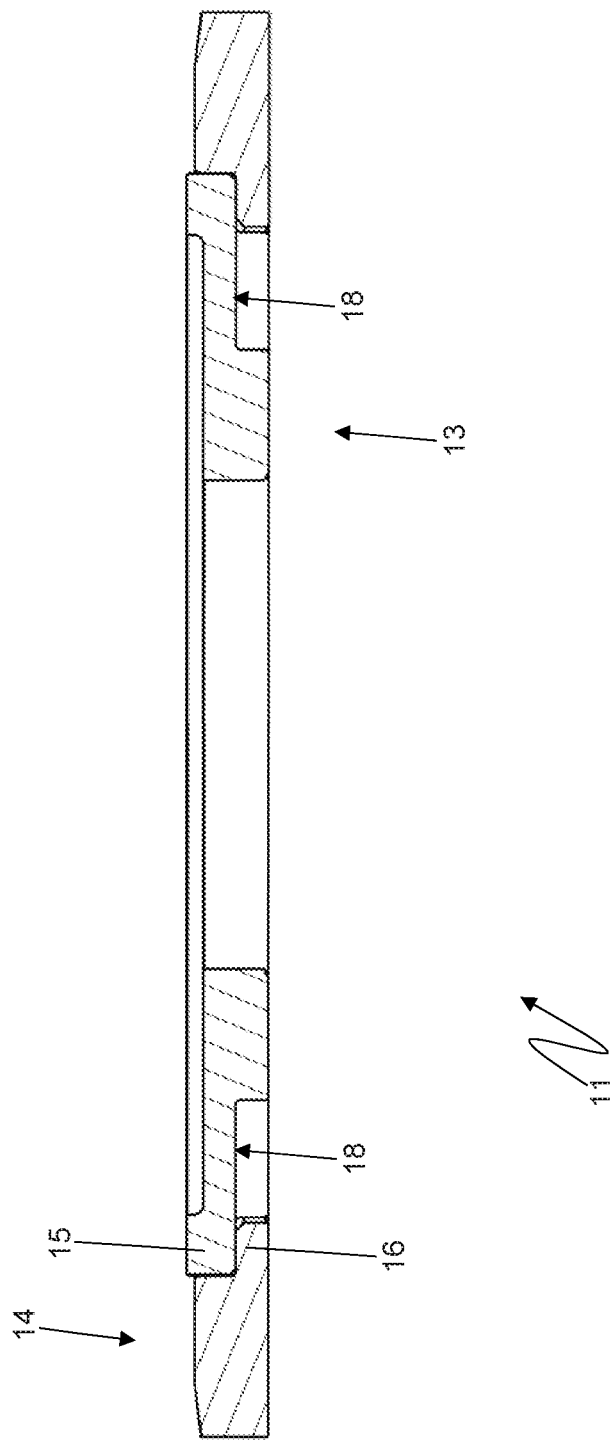

According to a preferred, though non-binding embodiment shown in the accompanying figures and well visible in FIGS. 9 and 10, in each end disc 11, the two components 13 and 14 are shaped so as to create a mechanical joint, which prevents the outer component 14 from axially sliding away from the magnetic core 4 relative to the inner component 13. In particular, the inner component 13 has, on the inside, an annular abutment 15, which strikes against a similar annular abutment 16 of the outer component 14, so as to prevent the outer component 14 from axially sliding away from the magnetic core 4 relative to the inner component 13.

According to the (non-limiting) embodiment shown in the accompanying figures, in each end disc 11, the inner component 13 has a series of lightening through holes 17, which are arranged axially (namely, parallel to the rotation axis 3) and symmetrically around the rotation axis 3.

According to FIGS. 4, 6, 8 and 10, in each end disc 11, the inner component 13 has a series of recesses 18 (concavities, depressions, notches), which originate from an outer edge of the inner component 13 and preferably are "U"-shaped. These recesses 18 are arranged in the area of (close to) the slots 8 of the magnetic core 4 (namely, of the permanent magnets 9 housed in the slots 8), so as to create a magnetic gap between the magnetic core 4 and the inner component 13 in the area of (close to) the slots 8 and, hence, reduce the magnetic flux generated by the permanent magnets 9, which affects the inner component 13 (as already mentioned above, the first metal material making up the inner components 13 is ferromagnetic).

In the embodiment shown in the accompanying figures, the recesses 18 of each inner component 13 are not through recesses and are arranged on the side of the magnetic core 4. According to another embodiment which is not shown herein, the recesses 18 of each inner component 13 are through recesses (namely, they go through the inner component 13 from side to side).

The embodiments described herein can be combined with one another, without for this reason going beyond the scope of protection of the invention.

The rotor 1 described above has numerous advantages.

Indeed, the end discs 11 are capable of keeping the lamination sheets 5 of the magnetic core 4 firmly stacked together (namely, the end discs 11 are capable of resisting without plastic deformations, namely without plasticizing) even in the presence of high loads (which are typical for large-sized rotors), at the same time without being affected by power losses due to significant parasitic currents.

This result is obtained by dividing each end disc 11 into the two components 13 and 14, which are arranged in different positions, are made of different metal materials and have different functions: the inner component 13, which must stand axial forces and is not affected by significant magnetic fields, is made of a first ferromagnetic metal material, which is very resistant (namely, with a high yield strength), whereas the outer component 14, which is not subjected to relevant mechanical loads and, on the other hand, is potentially affected by great magnetic fields, is made of a second non-magnetic material, which is relatively less resistant. In other words, each end disc 11 consists of the joining of two components 13 and 14, each with its specific function and, hence, made of a metal material optimized to fulfil that function.

Furthermore, the rotor 1 described above can be manufactured in a straightforward and low-cost manner, as the production of each end disc 11 requires the use of conventional metal materials and of conventional production technologies.

LIST OF THE REFERENCE NUMBERS OF THE FIGURES 1 rotor
2 shaft
3 rotation axis
4 magnetic core
5 lamination sheets 6 central hole
7 lightening holes
8 slots
9 permanent magnets
10 inserts
11 end discs
12 balancing holes
13 inner component
14 outer component
15 abutment
16 abutment
17 lightening holes
18 recesses

The invention claimed is:

1. A rotor (1) for a rotary electric machine; the rotor (1) comprising:
- a shaft (2), which is mounted so as to rotate around a rotation axis (3);
- a magnetic core (4), which is arranged around the shaft (2) and consists of a plurality of lamination sheets (5) stacked together;
- a series of axial slots (8), which are obtained inside the magnetic core (4);
- a series of permanent magnets (9), which are arranged in the slots (8) of the magnetic core (4); and
- a pair of end discs (11), which are arranged around the shaft (2) at the two opposite ends of the magnetic core (4) and are designed to keep the lamination sheets (5) of the magnetic core (4) stacked together;
- wherein the end discs (11) have balancing holes (12), which are arranged asymmetrically relative to the rotation axis (3) and dynamically balance the rotor (1) around the rotation axis (3);
- wherein each end disc (11) consists of an inner component (13) with an annular shape, which is arranged around the shaft (2) in a radial position more on the inside than the permanent magnets (9) and is made of a first metal material, and of an outer component (14) with an annular shape, which is arranged around the inner component (13), faces the permanent magnets (8), is made of a second metal material, which is different from the first metal material and is non-magnetic, and is provided with the balancing holes (12); and
- wherein, in each end disc (11), the inner component (13) has a series of recesses (18), which originate from an outer edge of the inner component (13) and are arranged in the area of the slots (8) of the magnetic core (4).

2. The rotor (1) according to claim 1, wherein the first metal material is ferromagnetic.

3. The rotor (1) according to claim 1, wherein the first metal material has higher mechanical performances than the second metal material.

4. The rotor (1) according to claim 1, wherein, in each end disc (11), the outer component (14) is coupled to the inner component (13) through interference.

5. The rotor (1) according to claim 1, wherein, in each end disc (11), the inner component (13) is coupled to the shaft (2) through interference.

6. The rotor (1) according to claim 1, wherein, in each end disc (11), the two components (13, 14) are shaped so as to create a mechanical joint, which prevents the outer component (14) from axially sliding away from the magnetic core (4) relative to the inner component (13).

7. The rotor (1) according to claim 1, wherein, in each end disc (11), the inner component (13) has a series of lightening through holes (17), which are symmetrically arranged around the rotation axis (3).

8. The rotor (1) according to claim 1, wherein the recesses (18) are "U"-shaped.

9. The rotor (1) according to claim 1, wherein the recesses (18) are arranged so as to create a magnetic gap between the magnetic core (4) and the inner component (13) in the area of the permanent magnets (9).

10. The rotor (1) according to claim 1, wherein the recesses (18) are arranged so as to reduce the magnetic flux generated by the permanent magnets (9), which affects the inner component (13).

11. The rotor (1) according to claim 1, wherein the recesses (18) of each inner component (13) are not through recesses and are arranged on the side of the magnetic core (4).

12. The rotor (1) according to claim 1, wherein the recesses (18) of each inner component (13) are through recesses.

13. The rotor (1) according to claim 1, wherein the inner component (13) has a series of lightening holes (17), which are symmetrically arranged around the rotation axis (3), are arranged at the same radial distance from the rotation axis (3) as the recesses (18) and are alternated with the recesses (18).

* * * * *